(12) United States Patent
Pinvidic et al.

(10) Patent No.: US 7,904,644 B1
(45) Date of Patent: Mar. 8, 2011

(54) DISK CHANNEL SYSTEM WITH SECTOR REQUEST QUEUE

(75) Inventors: Daniel R. Pinvidic, San Juan Capistrano, CA (US); Lim Hudiono, Laguna Niguel, CA (US); Stanley Cheong, Lake Forest, CA (US)

(73) Assignee: Marvell International Ltd., Hamilton (BM)

( * ) Notice: Subject to any disclaimer, the term of this patent is extended or adjusted under 35 U.S.C. 154(b) by 629 days.

(21) Appl. No.: 11/874,581

(22) Filed: Oct. 18, 2007

Related U.S. Application Data

(60) Provisional application No. 60/863,853, filed on Nov. 1, 2006.

(51) Int. Cl.
*G06F 13/00* (2006.01)

(52) U.S. Cl. .......................................... 711/112; 710/52

(58) Field of Classification Search .................. 711/112; 710/52
See application file for complete search history.

(56) References Cited

U.S. PATENT DOCUMENTS

| | | | | |
|---|---|---|---|---|
| 3,725,864 A | * | 4/1973 | Clark et al. ....................... 710/6 |
| 5,404,487 A | * | 4/1995 | Murata et al. .................. 711/113 |
| 6,125,427 A | * | 9/2000 | Oeda et al. .................... 711/111 |
| 6,170,023 B1 | * | 1/2001 | Beardsley et al. .............. 710/36 |
| 2004/0015743 A1 | * | 1/2004 | Si et al. ........................... 714/42 |

* cited by examiner

*Primary Examiner* — Jared I Rutz

(57) ABSTRACT

A disk channel includes disk channel modules that process data for a read/write operation on a rotating medium. A memory is accessible to the disk channel modules and comprises a sector request queue that has status information that is associated with each of the disk channel modules. A control module is in communication with and manages data transfer through the disk channel modules based on the sector request queue.

26 Claims, 7 Drawing Sheets

FIG. 6

| | DF Filled Information | | | | | Done Information | | | | | DC Error Information | | | | |
|---|---|---|---|---|---|---|---|---|---|---|---|---|---|---|---|
| Entry | Sec. Req. | LBA Offset | Re-Assign | Last Sec. | Valid | CH0 Byte FIFO Done | CH0 Symbol FIFO Done | SCC-CH0 Buffer Done | ECC Buffer Done | DF Done | CH0 Byte Error | CH0 Symbol Error | CRC Error | ECC Error | DF Error |
| 0 | 0003 | 0000 | 0 | 0 | 0 | 1 | 1 | 1 | 1 | 1 | 0 | 0 | 0 | 0 | 0 |
| 1 | 0004 | 0001 | 0 | 0 | 0 | 1 | 1 | 1 | 1 | 1 | 0 | 0 | 0 | 0 | 0 |
| 2 | 0007 | 0002 | 0 | 0 | 0 | 1 | 1 | 1 | 1 | 1 | 0 | 0 | 0 | 0 | 0 |
| 3 | 0008 | 0003 | 0 | 0 | 0 | 1 | 1 | 1 | 1 | 1 | 0 | 0 | 0 | 0 | 0 |
| 4 | 0009 | 0004 | 0 | 0 | 0 | 1 | 1 | 1 | 1 | 1 | 1 | 0 | 0 | 0 | 0 |
| 5 | 000B | 0005 | 0 | 1 | 1 | 0 | 0 | 0 | 0 | 0 | 0 | 0 | 0 | 0 | 0 |
| 6 | 000D | 0006 | 0 | 0 | 1 | 0 | 0 | 0 | 0 | 0 | 0 | 0 | 0 | 0 | 0 |
| 7 | 0000 | 0000 | 0 | 0 | 0 | 0 | 0 | 0 | 0 | 0 | 0 | 0 | 0 | 0 | 0 |

DISK CHANNEL SYSTEM WITH SECTOR REQUEST QUEUE

CROSS-REFERENCE TO RELATED APPLICATIONS

This application claims the benefit of U.S. Provisional Application No. 60/863,853, filed on Nov. 1, 2006. The disclosure of the above application is incorporated herein by reference in its entirety.

FIELD

The present disclosure relates to rotating storage devices, and more particularly to disk channel data paths and to control data transfer therein.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

The speed at which a rotating data storage device, such as a magnetic or an optical storage device, executes read and write operations affects the performance of a computer or other host device. A rotating data storage device may be, for example, a hard disk drive (HDD), a compact disc (CD) drive, a digital versatile disc (DVD) drive or a high definition/high data storage disc drive. Operational delay in the rotating data storage device can cause a corresponding delay in operation of the host device.

Typically, a HDD includes a disk channel with a disk formatter that performs a read or a write operation on one or more magnetic disks. Each disk includes tracks that store data. The tracks are divided into sectors. A read/write head is used to read from or write to the sectors. In use, the HDD receives a command signal that identifies a target sector or a block of target sectors for a read/write operation.

Current read/write operations have associated delays. As an example, in performing a write operation for a predetermined number of target sectors, a command signal for data to be written is generated. Based on the command signal, the disk channel receives the data in one sector increments. The sectors are handled one at a time and in a sequential format. Each sector is stored in memory associated with the disk channel and provided to the disk formatter. Upon error completion of correction coding and data formatting of a current sector, the disk channel receives a next or subsequent sector. Speed of the disk channel is limited based on such data transfer.

SUMMARY

In one embodiment, a disk channel is provided that includes disk channel modules that process data for a read/write operation on a rotating medium. Memory includes a sector request queue that has status information that is associated with each of the disk channel modules. A control module manages data transfer through the disk channel modules based on the sector request queue.

In other features, the control module manages reception of sector data to the disk channel, transfer of the sector data between the disk channel modules, and transmission of the sector data from the disk channel based on the sector request queue.

In other features, the control module bursts data for sectors into the disk channel.

In yet other features, the disk channel modules process data for sectors during the same time period. In other features, one of the disk channel modules includes the control module. In other features, the disk channel modules comprise a channel 0 module. In other features, the disk channel modules comprise an error correction coding module. In other features, the disk channel modules comprise a cyclical redundancy check module. In other features, the disk channel modules comprise a disk formatter.

In other features, the memory stores, associated with the sector request queue, at least one pointer that indicates sector status of a disk channel module. In other features, the at least one pointer includes at least one of a disk formatter pointer, an error correction code pointer, a cyclical redundancy check pointer, and a channel zero pointer.

In still other features, the sector request queue includes sector request information. In other features, the sector request queue includes logical block address information. In other features, the sector request queue includes reassign sector information associated with a defective or masked sector. In other features, the sector request queue includes sector information. In other features, the sector request queue includes entry valid information. In other features, the sector request queue includes sector complete information associated with each of the disk channel modules. In other features, the sector request queue includes bit error information.

In other features, the control module stops data transfer through the disk channel modules based on the bit error information.

In other features, the sector request queue includes bit error information associated with a disk channel module.

In other features, a hard disk drive is provided that includes the disk channel. In other features, the disk drive further includes a read/write head that transfers data between the rotating medium and the control module. In other features, the disk drive further includes a buffer memory, the control module managing data transfer between the disk channel and the buffer memory.

In further features, a method of operating a disk channel is provided that includes processing data for a read/write operation on a rotating medium via a disk channel modules. A memory that is accessible to the disk channel modules stores a sector request queue with status information that is associated with each of the disk channel modules. Data transfer through the disk channel modules is managed based on the sector request queue.

In other features, the method includes managing reception of sector data to the disk channel, transfer of the sector data between the disk channel modules, and transmission of the sector data from the disk channel based on the sector request queue.

In other features, the method further includes bursting data for sectors into the disk channel.

In other features, the method includes processing data for sectors during the same time period.

In yet other features, the method further includes storing, associated with the sector request queue, at least one pointer that indicates sector status of a disk channel module. In other features, the at least one pointer includes at least one of a disk formatter pointer, an error correction code pointer, a cyclical redundancy check pointer, and a channel zero pointer.

In still other features, the sector request queue includes sector request information. In other features, the sector request queue includes logical block address information. In other features, the sector request queue includes reassign sector information associated with a defective or masked sector. In other features, the sector request queue includes sector information. In other features, the sector request queue includes entry valid information. In other features, the sector request queue includes sector complete information associated with each of the disk channel modules. In other features, the sector request queue includes bit error information.

In other features, the method further includes stopping data transfer through the disk channel modules based on the bit error information.

In other features, the sector request queue includes bit error information associated with a disk channel module.

In further features, the method further includes transfers data between a rotating medium and a control module. In other features, the method further includes managing data transfer between the disk channel and a buffer memory.

In other features, a disk channel is provided that includes disk channel means for processing data for a read/write operation on a rotating medium. Storage means for access by the disk channel means and for storing a sector request queue that has status information that is associated with each of the disk channel means is included. Control means for communication with and for managing data transfer through the disk channel means based on the sector request queue is further included.

In yet other features, the control means manages reception of sector data to the disk channel, transfer of the sector data between the disk channel means, and transmission of the sector data from the disk channel based on the sector request queue.

In other features, the control means bursts data for sectors into the disk channel.

In still other features, the disk channel means process data for sectors during the same time period. In other features, one of the disk channel means includes the control means. In other features, the disk channel means comprise a channel 0 module. In other features, the disk channel means comprise an error correction coding module. In other features, the disk channel means comprise a cyclical redundancy check module. In other features, the disk channel means comprise a disk formatter.

In further features, the storing means stores, associated with the sector request queue, at least one pointer indicating sector status of a disk channel module. In other features, the at least one pointer includes at least one of a disk formatter pointer, an error correction code pointer, a cyclical redundancy check pointer, and a channel zero pointer.

In other features, the sector request queue includes sector request information. In other features, the sector request queue includes logical block address information. In other features, the sector request queue includes reassign sector information associated with a defective or masked sector. In other features, the sector request queue includes sector information. In other features, the sector request queue includes entry valid information. In other features, the sector request queue includes sector complete information associated with each of the disk channel modules. In other features, the sector request queue includes bit error information.

In yet other features, the control means stops data transfer through the disk channel means based on the bit error information.

In other features, the sector request queue includes bit error information associated with a disk channel module.

In other features, a hard disk drive is provided that includes the disk channel. In other features, the disk drive further includes read/write means for transferring data between the rotating medium and the control means. In other features, the disk drive further includes a buffer memory, the control means managing data transfer between the disk channel and the buffer memory.

In still other features, a disk formatter is provided that includes a memory that is accessible to disk channel modules and that includes a sector request queue that has status information that is associated with each of the disk channel modules. A control module is in communication with and manages data transfer through the disk channel modules based on the sector request queue. The control module performs a read/write operation on a rotating medium based on the sector request queue.

In other features, the control module manages reception of sector data, transfer of the sector data between the disk channel modules, and transmission of the sector data from the disk channel based on the sector request queue.

In other features, the control module bursts data for sectors into the disk channel.

In further features, the memory stores, associated with the sector request queue, at least one pointer that indicates sector status of a disk channel module. In other features, the at least one pointer comprises at least one of a disk formatter pointer, an error correction code pointer, and a channel zero pointer.

In other features, the sector request queue includes sector request information. In other features, the sector request queue includes logical block address information. In other features, the sector request queue includes reassign sector information associated with a defective or masked sector. In other features, the sector request queue includes sector information. In other features, the sector request queue includes entry valid information. In other features, the sector request queue includes sector complete information associated with each of the disk channel modules. In other features, the sector request queue includes bit error information.

In still other features, the control module stops data transfer through disk channel modules based on the bit error information.

In other features, the sector request queue includes bit error information associated with a disk channel module.

In yet other features, a method of operating a disk formatter is provided that includes accessing a memory that includes a sector request queue that has status information that is associated with each of multiple disk channel modules via the disk channel modules. Data transfer through the disk channel modules is communicated and managed based on the sector request queue. A read/write operation is performed on a rotating medium based on the sector request queue.

In other features, the method includes managing reception of sector data, transferring the sector data between the disk channel modules, and transmitting the sector data from the disk channel based on the sector request queue.

In further features, the method includes bursting data for sectors into the disk channel.

In other features, the method includes storing, associated with the sector request queue, at least one pointer that indicates sector status of a disk channel module. In other features, the at least one pointer includes at least one of a disk formatter pointer, an error correction code pointer, and a channel zero pointer.

In yet other features, the sector request queue includes sector request information. In other features, the sector request queue includes logical block address information. In other features, the sector request queue includes reassign sector information associated with a defective or masked sector. In other features, the sector request queue includes sector information. In other features, the sector request queue includes entry valid information. In other features, the sector request queue includes sector complete information associated with each of the disk channel modules. In other features, the sector request queue includes bit error information.

In other features, the method further includes stopping data transfer through disk channel modules based on the bit error information.

In other features, the sector request queue includes bit error information associated with a disk channel module.

In still other features, a disk formatter is provided that includes storing means for access by disk channel modules and for storing a sector request queue that has status information that is associated with each of the disk channel modules. Control means for communicating with and for managing data transfer through the disk channel modules based on the sector request queue is included. The control means performs a read/write operation on a rotating medium based on the sector request queue.

In other features, the control means manages reception of sector data, transfer of the sector data between the disk channel modules, and transmission of the sector data from the disk channel based on the sector request queue.

In other features, the control means bursts data for sectors into the disk channel.

In further features, the storing means stores, associated with the sector request queue, at least one pointer indicating sector status of a disk channel module. In other features, the at least one pointer comprise at least one of a disk formatter pointer, an error correction code pointer, and a channel zero pointer.

In other features, the sector request queue includes sector request information. In other features, the sector request queue includes logical block address information. In other features, the sector request queue includes reassign sector information associated with a defective or masked sector. In other features, the sector request queue includes sector information. In other features, the sector request queue includes entry valid information. In other features, the sector request queue includes sector complete information associated with each of the disk channel modules. In other features, the sector request queue includes bit error information.

In other features, the control means stops data transfer through disk channel modules based on the bit error information.

In other features, the sector request queue includes bit error information associated with a disk channel module.

In still other features, the systems and methods described above are implemented by a computer program executed by one or more processors. The computer program can reside on a computer readable medium such as but not limited to memory, non-volatile data storage and/or other suitable tangible storage mediums.

Further areas of applicability of the present disclosure will become apparent from the detailed description provided hereinafter. It should be understood that the detailed description and specific examples, while indicating the preferred embodiment of the disclosure, are intended for purposes of illustration only and are not intended to limit the scope of the disclosure.

BRIEF DESCRIPTION OF THE DRAWINGS

The present disclosure will become more fully understood from the detailed description and the accompanying drawings, wherein:

FIG. 6 is a tabular diagram of sector request queue illustrating an example state of disk channel module pointers in accordance with an embodiment of the present disclosure;

DETAILED DESCRIPTION

Figure 1:
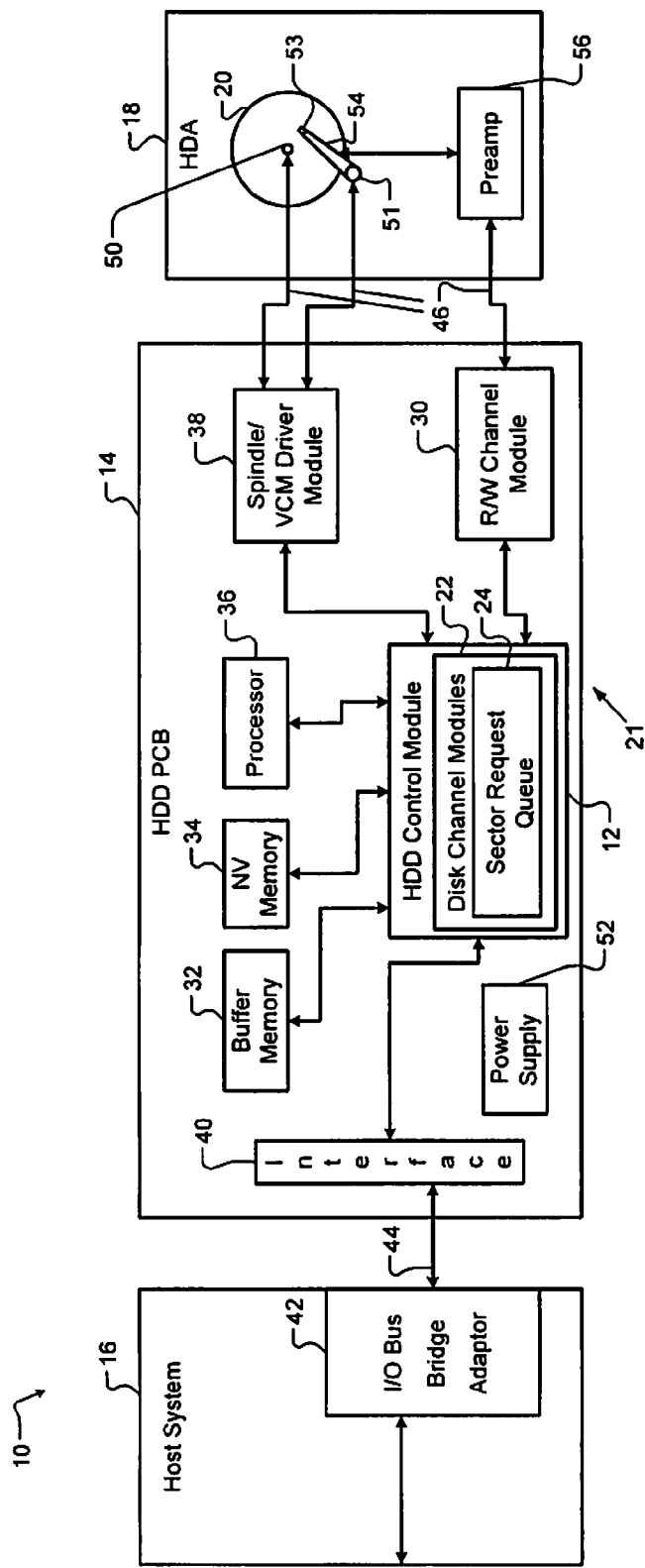
FIG. 1 is a functional block diagram of a hard disk drive system incorporating a hard disk drive control module in accordance with an embodiment of the present disclosure.

The following description is merely exemplary in nature and is in no way intended to limit the disclosure, its application, or uses. For purposes of clarity, the same reference numbers will be used in the drawings to identify similar elements. As used herein, the terms module and state machine refer to Application Specific Integrated Circuits (ASICs), electronic circuits, processors (shared, dedicated, or grouped) and memories that execute one or more software or firmware programs, combinational logic circuits, and/or other suitable components that provide the described functionality. As used herein, the phrase at least one of A, B, and C should be construed to mean a logical (A or B or C), using a non-exclusive logical or. It should be understood that steps within a method may be executed in different order without altering the principles of the present disclosure.

Referring now to FIG. 1, a functional block diagram of a hard disk drive (HDD) system 10 incorporating a HDD control module 12 is shown. Although HDDs are primarily shown and described herein, the embodiments disclosed below may apply to other rotating data storage devices, such as a compact disc (CD) drive, a digital versatile disc (DVD) drive or a high definition/high data storage disc drive. The HDD system 10 includes a HDD printed circuit board (PCB) 14 that is coupled to a host system 16 and a hard disk assembly (HDA) 18. The HDD PCB 14 reads from and writes to sectors of a rotating storage medium 20 of the HDA 18 via the HDD control module 12. The HDD includes a disk channel 21 through which it performs read/write tasks via disk channel modules 22 based on information contained within a sector request queue 24. The disk channel 21, the sector request queue 24, and various read/write operations are described in detail below.

The HDD PCB 14 also includes a read/write channel module 30, a buffer memory 32, a nonvolatile memory 34, a processor 36, and a spindle/voice-coil motor (VCM) driver module 38. The read/write channel module 30 processes data received from and transmitted to the HDA 18. The HDD control module 12 controls components of the HDA 18 and communicates with an external device, such as the host system 16 via an I/O interface 40. The I/O interface 40 is in communication with an I/O bus bridge adaptor 42 of the host system 16 via a bus 44, which may be a small computer system interface (SCSI) bus, Fibre channel bus, or a serial attached SCSI (SAS) bus. The host system 16 may include a computer, a multimedia device, a mobile computing device, etc. The I/O interface 40 may include wireline and/or wireless communication links.

The HDD control module 12 may receive data from the HDA 18, the read/write channel module 30, the buffer memory 32, the nonvolatile memory 34, the processor 36, the spindleNCM driver module 38, and/or the I/O interface 40. The read/write channel module 30 and the spindleNCM driver module 38 are in communication with the HDA 18 via HDA communication lines 46. The processor 36 may process the data, including encoding, decoding, filtering, and/or formatting. The processed data may be output to the HDA 18, the read/write channel module 30, the buffer memory 32, the nonvolatile memory 34, the processor 36, the spindleNCM driver module 38, and/or the I/O interface 40.

The HDD control module 12 may use the buffer memory 32 and/or the nonvolatile memory 34 to store data related to the control and operation of the HDD 10. The buffer memory 32 may include dynamic random access memory (DRAM), synchronous DRAM (SDRAM), and/or other memory types. The nonvolatile memory 34 may include flash memory (including NAND and NOR flash memory), phase change memory, magnetic RAM, and/or multi-state memory, in which each memory cell has more than two states. The spindleNCM driver module 38 controls a spindle motor 50 and a VCM 51. The HDD PCB 14 also includes a power supply 52 that provides power to the components of the HDD 10.

The HDA 18 includes the rotating storage medium 20. The HDA 18 further includes a read/write device, such a read/write head 53. The read/write device may be arranged on an actuator arm 54, as shown, and read and write data on the rotating storage medium 20. Additionally, the HDA 18 includes the spindle motor 50 that rotates the rotating storage medium 20 and the VCM 51 that actuates the actuator arm 54. A preamplifier device 56 amplifies signals generated by the read/write device during read operations and provides signals to the read/write device during write operations.

Figure 2:
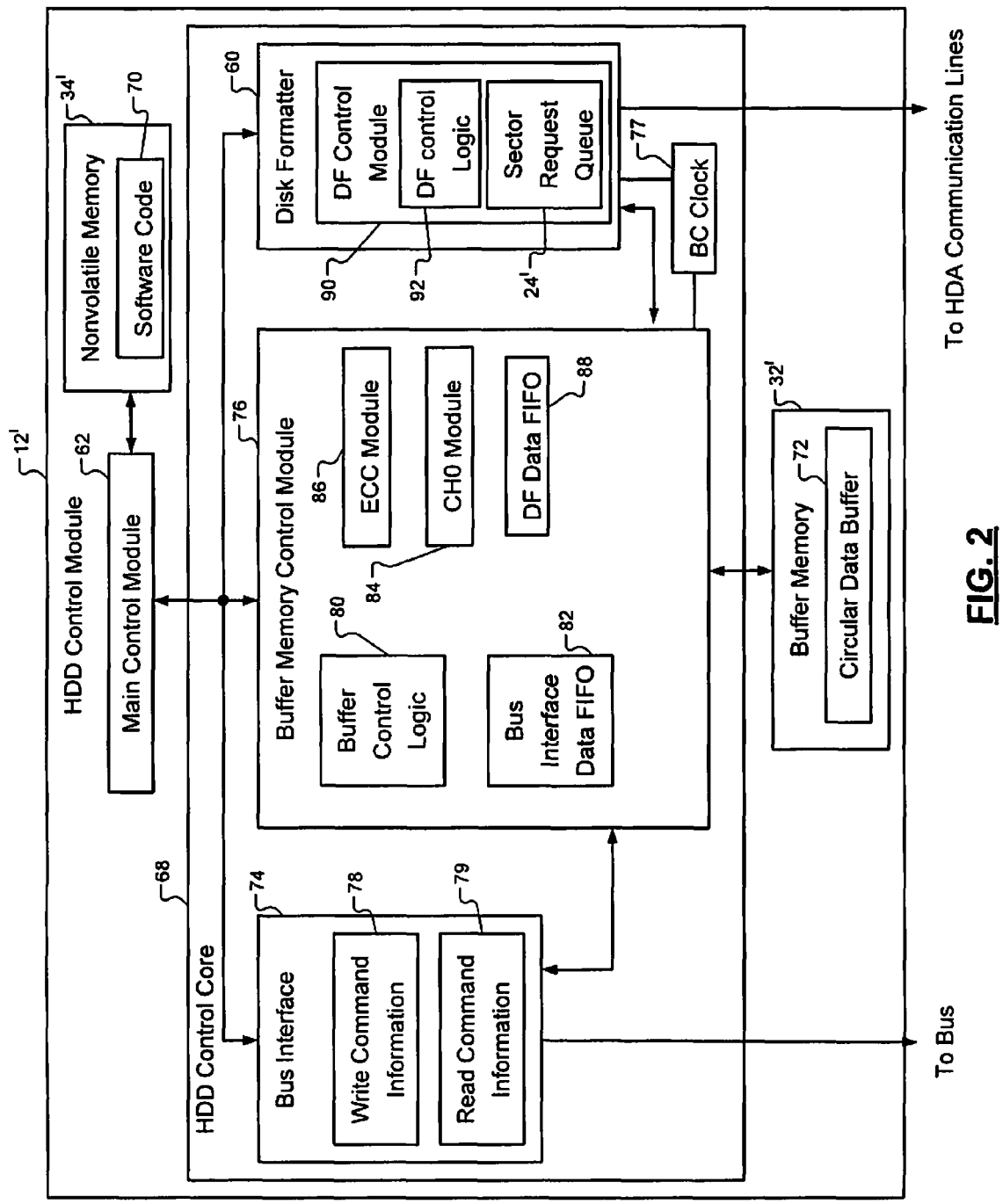
FIG. 2 is a functional block diagram of a hard disk drive control module incorporating a disk formatter in accordance with an embodiment of the present disclosure.

Referring to FIG. 2, a functional block diagram of a HDD control module $12^I$ incorporating a disk format module or disk formatter (DF) 60 is shown. The HDD control module $12^I$ includes a main control module 62, a buffer memory $32^I$, a nonvolatile memory $34^I$ and a HDD control core 68. The HDD control core 68 handles data flow between a host bus and HDA communication lines. The host bus may be bus 44, such as a SCSI or Fibre channel port, or other host bus. The HDD control module $12^I$ transfers data between a rotating medium and the buffer memory $32^I$, transfers data between the buffer memory $32^I$ and the bus 44, and performs error correction and cyclical redundancy check (CRC) calculations.

The HDD control core 68 is controlled by the main control module 62, which executes software/firmware code 70 in the nonvolatile memory $34^I$. In addition to reading from and writing to a rotating medium, the main control module 62 handle tasks, such as moving a read/write head to a proper track and/or sector position.

The buffer memory $32^I$ is used to buffer data between the rotating medium 20 and the bus 44. This compensates for delays, latency, and timing differences between the rotating medium and the bus 44. The buffer memory $32^I$ includes a circular data buffer 72. The buffer memory $32^I$ may include DRAM. In some configurations, the buffer memory $32^I$ also serves as the memory for the main control module 62.

The HDD control core 68 includes a bus interface 74 and a buffer memory control module 76, in addition to the DF 60. The HDD control core 68 also includes a buffer controller clock 77 that provides a clock signal to the DF 60 and the buffer memory control module 76. The buffer controller clock 77 may also provide the clock signal to the bus interface 74. The bus interface 74 implements bus protocols to receive write command signals and read command signals having write command information 78 and read command information 79, respectively. The bus interface 74 passes the write command information 78 and the read command information 79 to the buffer memory $32^I$ through the buffer memory control module 76. The bus interface 74 also has protocols for transmission of read data from a rotating medium to a host system.

The buffer memory control module 76 controls interleaved access to the buffer memory $32^I$ by the DF 60, the bus interface 74, and the main control module 76. The buffer memory control module 76 also arbitrates access of buffered data between the buffer memory $32^I$ and the DF 60, the bus interface 74, and the main control module 76. The buffer memory control module 76 includes buffer control logic 80, an bus interface data first-in-first-out (FIFO) buffer 82, a channel (CH)0 module 84, an error correction code (ECC) module 86, and one or more disk channel or DF data FIFOs 88.

The buffer control logic 80 controls the functionality of the buffer control module 76. The bus interface data FIFO 82 buffers data between the bus interface 74 and the buffer memory $32^I$. The CH0 module 84 and the ECC module 86 are part of a disk channel, which may be referred to as a CH0. The disk channel facilitates data transfer between the buffer memory $32^I$ and the rotating medium. The CH0 module 84 communicates with the buffer memory $32^I$. The ECC module 86 generates ECC bits, which are combined with received data prior to writing to the rotating medium. The ECC bits may be encoded prior to being written to a rotating medium and may be decoded upon being read from the rotating medium for error detection and correction purposes. The disk channel data FIFOs 88 buffer data between the buffer memory $32^I$ and the DF 60 and may be part of the CH0 module 84 and/or the ECC module 86.

The DF 60 includes a DF control module 90 with DF control logic 92 and a sector request queue $24^I$. The DF 60 controls the writing of data to a rotating storage medium. The DF 60 receives data from the buffer memory $32^I$ through the buffer memory control module 76, formats the data, and sends the data to a read/write head. The DF may generate and send data request signals to the buffer memory control module 76. The buffer memory control module 76 provides data from the buffer memory $32^I$ based on the data request signals. The DF 60 also monitors the sector of a track over which the read/write head is positioned to determine the proper timing and/or sending of the data to the read/write head. The functionality of the DF 60 is controlled by a disk control module.

Any of the control modules 62, 76, 84, 86, 90 of the HDD control module $12^I$ may receive physical sector identification addresses and convert them to logical block addresses (LBAs). The LBAs may be converted to sector numbers and track numbers. The sector numbers and track numbers are stored. In one embodiment, the main control module 62 performs this task upon receiving command information. In another embodiment, the DF control module 90 performs this task.

Figure 3:
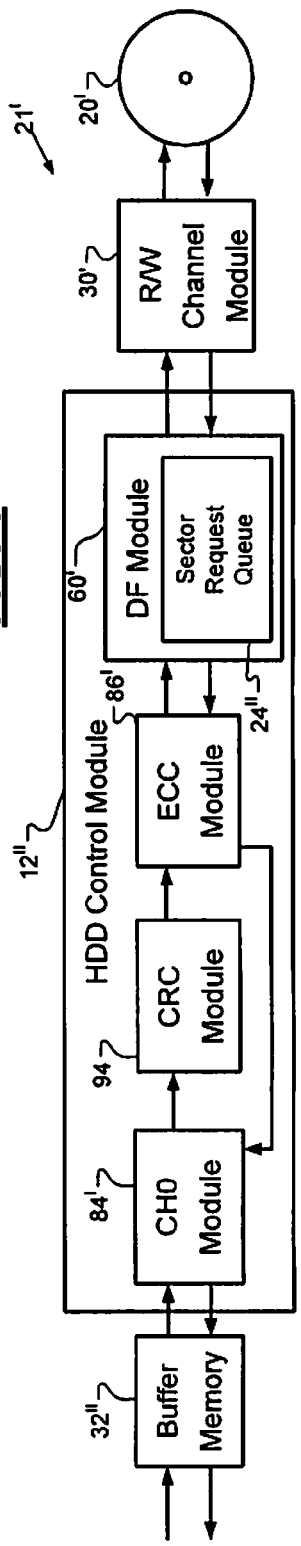
FIG. 3 is a block diagram of a disk channel in accordance with an embodiment of the present disclosure.

Referring now to FIG. 3, a block diagram of a disk channel $21^I$ is shown. The disk channel $21^I$ includes the HDD control module $12^I$ that processes sector data to and from a rotating medium $20^I$ via a read/write channel module $30^I$. The HDD control module $12^{II}$ includes a CH0 module $84^I$ that communicates sector data to and from a buffer memory $32^{II}$. A CRC module 94 performs a CRC check on data received from the CH0 module prior to passage to an ECC module $86^I$. The ECC module $86^I$ adds or removes error correction coding bits to the CRC checked data or from formatted data received from the DF module $60^I$. The DF module $60^I$ formats error correction coded data from the ECC module $86^I$ and formats data received from a rotating medium $20^I$ based on information within a sector request queue $24^{II}$. A read/write channel module $30^I$ is coupled between the DF module $60^I$ and a rotating medium $20^I$.

Figure 4:
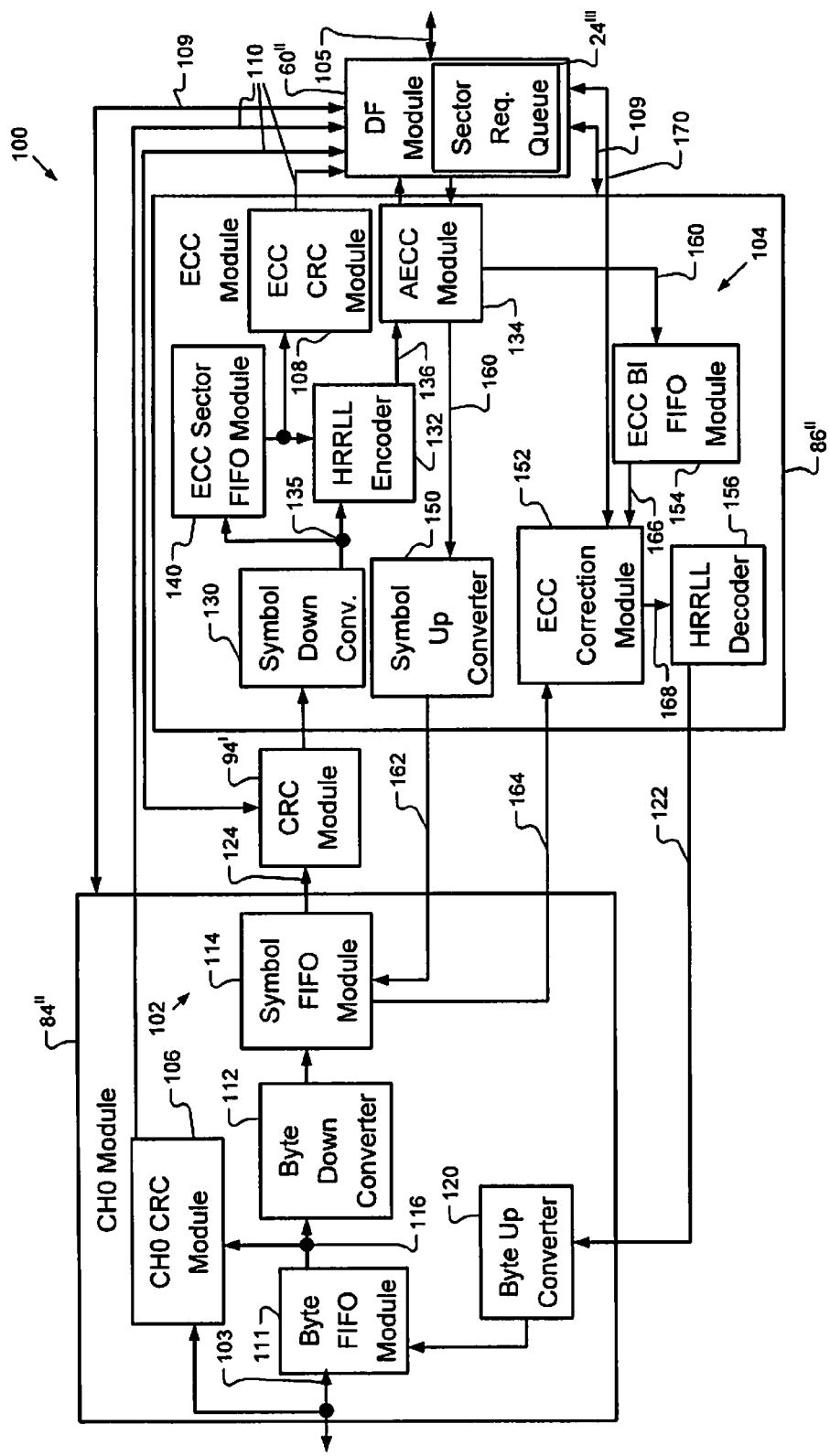
FIG. 4 is a block diagram of a disk channel portion of a HDD control module in accordance with an embodiment of the present disclosure.

Referring now to FIG. 4, a block diagram of a disk channel portion 100 of a HDD control module $12^{II}$ is shown. The disk channel portion 100 includes a CH0 module $84^{II}$, an ECC module $86^{II}$ and a DF module $60^{II}$. The disk channel portion 100 includes a write path 102 for reception of input data 103 and a read path 104 for transmission of output data 105. The disk channel portion 100 also includes multiple CRC modules, namely a CH0 CRC module 106, a stand alone CRC module $94^I$ and an ECC CRC module 108, which perform checks along the write path 102. The DF module $60^{II}$ includes a sector request queue $24^{III}$, which stores information received from each of the disk channel modules $84^{II}$, $86^{II}$ and $60^{II}$, as well as from each of the CRC modules 106, 108, $94^I$. Disk channel module communication lines 109 are shown for communication between the disk channel modules $84^{II}$, $86^{II}$ and $60^{II}$ and the DF module $60^{II}$. CRC communication lines 110 are shown for communication between the CRC modules 106, 108, $94^I$ and the DF module $60^{II}$. This provides a monitor of sector data, correction when appropriate, and an indication of when to pause or stop data transfer at various locations along the write path 102.

The CH0 module $84^{II}$ includes a byte FIFO module 111, a byte down converter 112 and a symbol FIFO module 114. The input data 103 is received and stored in the byte FIFO 111, down converted and then stored in the symbol FIFO 114. The byte FIFO module and the symbol FIFO module may operate in a FIFO flush mode or in a FIFO abort mode. When in the FIFO flush mode, the modules move good sector data to an intended final destination. The final destination may be a rotating media, when performing a write operation, or a buffer memory, when performing a read operation. When in the FIFO abort mode, the modules cease operation due to an error condition, which prevents data from moving through a data pipeline. A current disk channel operation is aborted and additional data is prevented from progressing through the pipeline. In one embodiment, the byte down converter 112 converts bytes of data into words of data. For example, the byte down converter 112 may convert four 8-bit bytes or 32-bit data sections into 20-bit words.

The CH0 module $84^{II}$ also includes the CH0 CRC module 106, which performs any number of CRCs. As shown, the CH0 CRC module 106 performs a first CRC on the received data 103 and a second CRC on byte stored data 116 that is being transferred from the byte FIFO 111 to the byte down converter 112. The CH0 module $84^{II}$ further includes a byte up converter 120, which up converts run length limited (RLL) decoded data 122 from the ECC module $86^{II}$ prior to being stored in the byte FIFO 111. The up conversion is similar to and opposite that of the byte down conversion.

The CRC module $94^I$ is coupled between the CH0 module $84^{II}$ and the ECC module $86^{II}$. The CRC module $94^I$ performs a CRC on symbol stored data 124 from the symbol FIFO 114.

The ECC module $86^{II}$ includes a symbol down converter 130, a high rate RLL (HRRLL) encoder 132 and an advanced error correction code (AECC) module 134. The symbol down converter 130 converts words received from the CRC module $94^I$ to symbols, such as 10-bit symbols. The HRRLL encoder 132 receives and encodes down converted symbols 135 from the down converter 130. The HRRLL encoder 132 prevents long stretches of no transitions, and therefore decoding uncertainty. The HRRLL encoder 132 limits the amount of continuous repeated and uninterrupted 0s and 1s.

The AECC module 134 performs high rate encoding on a data portion and low rate encoding on a Reed-Solomon or parity bit portion of encoded symbols 136 received from the HRRLL encoder 132. The AECC module 134 encodes data before being written to a rotating medium, which provides improved recovery of ECC encoded bits. The AECC 134 may also perform permutted error correction coding.

The ECC module $86^{II}$ further includes an ECC sector FIFO module 140 that also receives the down converted symbols 135. The stored symbols may be provided to the HRRLL encoder 132 and to the ECC CRC module 108.

The ECC module $86^{II}$ also includes a symbol up converter 150, an ECC correction module 152, an ECC bus interface (BI) FIFO module 154 and a HRRLL decoder 156. The symbol up converter 150 receives and up converts AECC decoded data 160 from the rotating medium to generate up converted data 162. The up converted data 162 is sent to the symbol FIFO 114, which outputs up converted and stored data 164. The AECC decoded data 160 is also passed to and stored in the ECC BI FIFO 154, which outputs decoded and stored data 166. The ECC correction module 152 receives and compares the up converted and stored data 164 with the decoded and stored data 166 and corrects bit errors to generate a corrected data signal 168. The ECC correction module 152 may be in communication with the DF module $60^{II}$ via a correction signal line 170. The HRRLL decoder 156 decodes the corrected data signal, which is sent to the byte up converter 120.

The DF module $60^{II}$, for the embodiment shown, manages and controls operation of the disk channel portion 100. The DF module $60^{II}$ provides a centralized location for the management of sectors as they advance through different pipeline stages of a disk channel. The DF module $60^{II}$ monitors and controls the transfer of data between each of the modules $84^{II}$, $94^I$, $86^{II}$. The DF module $60^{II}$ also monitors the state of the data and of the modules $84^{II}$, $94^I$, $86^{II}$. Although the DF module $60^{II}$ is shown and described as having logic to perform the stated control and management, other modules, such as the modules $84^{II}$, $94^I$, $86^{II}$, in a disk channel or elsewhere may have similar logic. Also, other modules within a disk channel or elsewhere may have access to a sector request queue or the like. In the shown embodiment, the modules $84^{II}$, $94^I$ and $86^{II}$ receive information in and provide information for the sector request queue via the DF module $60^{II}$.

Figure 5:
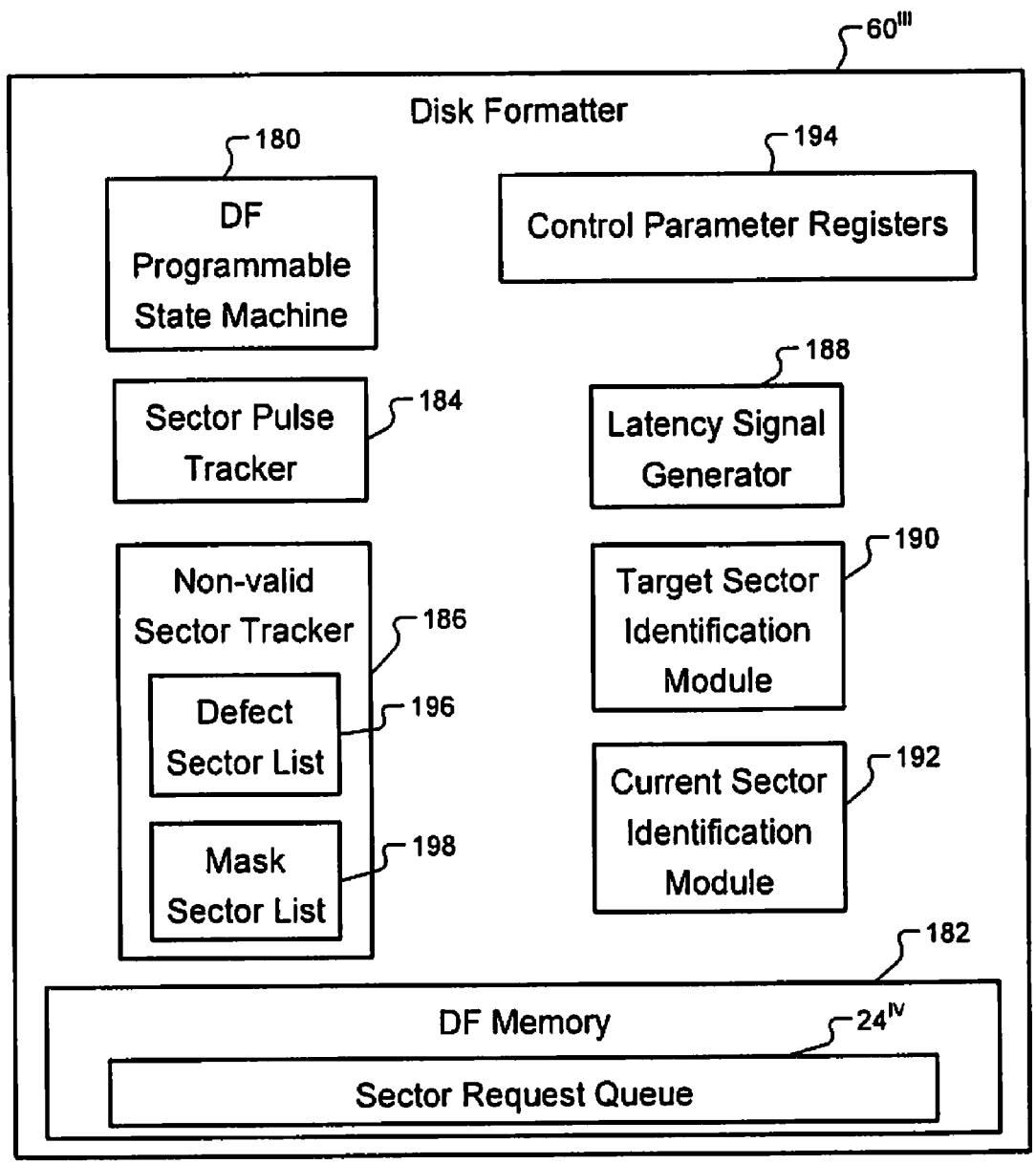
FIG. 5 is a block diagram of a disk formatter in accordance with an embodiment of the present disclosure.

Referring to FIG. 5, a block diagram of a DF $60^{III}$ is shown. The DF $60^{III}$ includes a DF programmable control module or state machine 180 and a sector request queue $24^{IV}$. The DF state machine 180, in general, controls the operation of the DF $60^{III}$. The sector request queue $24^{IV}$ includes various disk channel information and may be stored in DF memory 182. An example of a sector request queue is shown and is described in detail with respect to the embodiment of FIG. 6 below.

The DF $60^{III}$ also includes a sector pulse tracker 184, a non-valid sector tracker 186, a latency signal generator 188, a target sector identification module (TSIM) 190, a current sector identification module (CSIM) 192, and various control parameter registers 194. The sector pulse tracker 184, the non-valid sector tracker 186, the latency signal generator 188, the TSIM 190, and the CSIM 192 may be part of the DF state machine 180 or separate stand alone devices as shown. The sector pulse tracker 184, the defective sector tracker 186, the latency signal generator 188, the TSIM 190, and the CSIM 192 are in communication with, load, and adjust information contained in the control parameter registers 194.

The sector pulse tracker 184 detects sector pulses, which aid in identifying a current sector. When a read/write head passes over the beginning of a sector, that sector has an associated identification pulse that is generated and detected by the sector pulse tracker 184. The sector pulse tracker 184 may be used in tracking sector pulses for identification and detection of a target sector. The sector pulse tracker 184 may perform tasks based on format tables.

The non-valid sector tracker 186 includes a defective list 196 and/or a masked list 198. The defective sector list 196 includes identification addresses, sector numbers and/or track numbers of defective sectors. The masked sector list 198 includes identification addresses, sector numbers and/or track numbers of sectors that have been masked. A valid sector is a sector that is not defective or masked. A sector may be masked when it is defective, contains an error, or for some other reason. When a sector is masked, it is skipped or ignored, such that it is not involved in a read/write operation. The sector pulse tracker 184 and the non-valid sector tracker 186 may be stored in and/or have associated memory.

The latency signal generator 188 generates a latency signal. The latency signal is associated with the lead time or preparation time to perform a read/write operation to a rotating medium. The extent of the preparation time is referred to as the preparation period. The preparation period may include calculation time, register load time, data transfer time, etc. The preparation period may include time to determine a current sector, time to load control parameter information into registers, and time to load data into a buffer. When in the read/write ready mode the DF is ready to read from or write to a rotating medium upon detection of a target start sector and/or a command start sector. A target start sector refers to a first sector in a block of target sectors on which to perform a read/write operation, relative to the corresponding track. A command start sector refers to a sector within a block of target sectors on which to start a read/write operation. The command start sector may be any non-defective/non-masked sector in a track including the target start sector.

The TSIM 190 determines the block of target sectors to perform a read/write operation. The TSIM 190 may receive command signals, such as from a HDD control module, a host system control module, or elsewhere, and based thereon determine a set of desired sectors on which to perform the read/write operation. The TSIM 190 may convert LBAs into sector and track numbers. The TSIM 190 may determine the appropriate target sectors based on information in the defective sector list and the masked sector list.

The CSIM 192 determines the current sector over which a read/write head is positioned. The CSIM 192 may determine the current sector based on information received from the sector pulse tracker.

The control parameter registers 194 may include a target start LBA register, a target end LBA register, a target sector block register, a target start sector register, a target end sector register, a buffer sector size register, a buffer memory address pointer register, a command latency register, and other registers. The control parameter registers 194 may also include skip sector registers associated with defective sectors or masked sectors, such as that in the defective list 196 and the masked list 198.

Referring now to FIG. 6, a tabular diagram of sector request queue 24$^V$ illustrating an example state of disk channel module pointers for a particular moment in time is shown. The sector request queue 24$^V$, as shown, includes eight rows 0-7 and fifteen columns. Of course, there may be any number of rows and columns with associated entries. The eight rows shown are associated with the monitoring of eight sectors simultaneously. The columns are divided into DF filled information, done information, and DC error information.

The DF filled information includes sector request information, LBA offset information, reassign sector information, last sector information, and "Entry valid" information. The stated information is provided by a DF. The sector request information contains sector identification information allowing a DF to identify a particular sector. The sector identification information may contain an address, for example, from 0000-1FFF. Although eight sectors may be loaded, for the embodiment shown only seven sectors are loaded. In one embodiment, 7 sectors are read starting with sector number 3. The seven sectors are sector number 3, 4, 7, 8, 9, B, and D with LBA Offset 0 to 6. A defective sector list may be supplied that includes sector numbers 5, 6, A, and C.

The LBA offset plus the initial LBA value becomes the LBA Seed Value for the CRC calculation of the requested sector. In some cases, LBAs are not sequential. Thus, an adjustment to the LBA value is performed to compensate for skipped or missing sectors. The LBA adjustment information is used by CRC modules. Since CRCs are computed at different points in a data pipeline, the corresponding LBA value for each sector is calculated. By having the LBA adjustment values as part of an entry, each disk channel module is able to use the LBA value to recalculate a new CRC seed value.

The reassign sector information is a flag bit to indicate that the sector has been moved due to defective media, which may be skipped. The DF may stop processing the reassign sector. The last sector information provides an indication of a last target sector, which is the last sector read from or written to the rotating medium. At any given moment, either all of the last sector bit entries are set to 0 or one of the last sector entries is set to 1. The DF sets the "Entry valid" bit once it has calculated the sector number and its LBA offset. The Entry valid bit is a flag bit for other modules, such as the ECC and CH0 modules, and indicates that the entry has valid information. This allows use of the entry by the ECC and CH0 modules. When the valid bit for an entry is zero, the ECC and CH0 modules do not use the entry.

The done information includes a CH0 Byte FIFO done indication, a CH0 Symbol FIFO done indication, an ECC-CH0 Buffer done indication, an ECC Buffer done indication and a DF done indication. The done indications refer to when the corresponding module has completed processing of a particular sector. The done indications may each include one or more bits. The CH0 Byte FIFO sets the CH0 Byte FIFO done bit to one when it is done with a sector. The CH0 Symbol FIFO sets the CH0 Symbol done bit to one when it is done with a sector. The ECC-CH0 Buffer set the ECC-CH0 Buffer done bit to one when it is done with a sector. The ECC Buffer sets the ECC Buffer done bit to one when it is done with a sector. DF sets the DF done bit to one when DF is done with a sector. The done indications may be in the form of one or more bits. DF resets the done indication bits when all modules finish processing the sector and there is no error.

The error information includes the CH0 Byte FIFO error indication, the CH0 symbol error indication, the ECC-CH0 error indication, the ECC buffer error indication and the DF error indication. The error indications may each include one or more bits. The CH0 Byte FIFO sets the CH0 Byte FIFO error bit to one when an error condition occurs while it is processing the sector. CH0 Symbol FIFO sets the CH0 Symbol FIFO error bit to one when an error condition occurs while it is processing the sector. The ECC-CH0 Buffer module sets the ECC-CH0 Buffer error bit to one when an error condition occurs while it is processing the sector. The ECC Buffer module sets the ECC Buffer error bit to one when an error condition occurs while it is processing the sector. The DF module sets the DF error bit to one when an error condition occurs while it is processing the sector. This provides an identification of the sector within which there is a bit error and the location in the disk channel that the error is detected. The DF or other modules stop data transfer through the disk channel for the sector that has the error.

In addition to the entries, the sector request queue also has associated pointers that indicate the sector on which a particular disk channel module is currently processing. The pointers may includes a DF write pointer 250, a CH0 byte read pointer 252, a CH0 symbol read pointer 254, a ECC-CH0 Buffer read pointer 256, an ECC buffer read pointer 258 and a DF read pointer 260.

The DF write pointer 250 is a pointer that is used by a DF to fill in one entry in the sector request queue $24^V$. The DF fills in the sector requested information, the LBA offset information, the reassign sector information and the last sector information. Once the DF fills the stated information, the DF sets the entry valid information or bit to 1.

The CH0 byte read pointer 252 is a pointer that is used by a CH0 byte FIFO module to access one entry in the sector request queue. When the CH0 byte FIFO module has finished an operation on an entry, the CH0 byte FIFO module sets a CH0 byte FIFO done bit. The CH0 byte FIFO module also sets the CH0 byte FIFO error bit when an error condition occurs in the CH0 byte FIFO module.

The CH0 symbol read pointer 254 is a pointer that is used by a CH0 symbol FIFO module to access one entry in the sector request queue. When the CH0 symbol FIFO module has finished an operation on an entry, the CH0 symbol FIFO module sets a CH0 symbol FIFO done bit. The CH0 symbol FIFO module also sets the CH0 symbol FIFO error bit when an error condition occurs in the CH0 symbol FIFO module.

The ECC-CH0 Buffer read pointer 256 is a pointer that is used by the ECC-CH0 Buffer module to access one entry in the sector request queue. When the ECC-CH0 Buffer module has finished an operation on an entry, the ECC-CH0 Buffer module sets the ECC-CH0 Buffer done bit. The ECC-CH0 Buffer module also sets the ECC-CH0 Buffer error bit when an error condition occurs in the ECC-CH0 Buffer module.

The ECC buffer read pointer 258 is a pointer that is used by the ECC module to access one entry in the sector request queue. When the ECC module has finished an operation on an entry, the ECC module sets the ECC done bit. The ECC module also sets the ECC error bit when an error condition occurs in the ECC module.

The DF read pointer is a pointer 260 that is used by a DF to access one entry in the sector request queue. When the DF has finished an operation for an entry, the DF sets the DF done bit. The DF may also set the DF error bit when an error condition occurs in the DF module.

Other pointers may be used. For example, due to sector size and memory size an instance may occur when a disk channel receives data that overlaps two sectors. For instance, 4-bytes of data may be associated with a current sector and another 4-bytes of data may be associated with a subsequent sector. For this reason, additional pointers may be used to track both 4-byte data sections.

The DF checks the DF done, the ECC done, the CRC done, the CH0 symbol done and the CH0 byte done bits. When the done bits are set and there is no error, the disk channel has processed the associated sector or data entry and that entry is erased from the sector requested queue. The DF resets the entry valid bit to 0 for that entry. The DF, in general, fills the sector request queue until it detects the last requested sector, it detects that a disk channel module error bit is set, it detects that a reassign sector bit is set, or it detects error or abort condition.

The example shown is for a disk write operation to write seven sectors starting with Sector number 3 having LBA offset 0000. The DF scans defective sector and masked sector lists to determine the sector requested and the corresponding LBA offset. Based on the defective sector list and the provided example, the DF identifies Sector numbers 5, 6, A and C as defective. For this reason sector numbers 5, 6, A and C are not shown in sector numbers 0-7. For the provided example there is no skipping and no reassign. As such, the OF fills the DF filled information columns as shown. Note that the entry row number 6 has a last sector bit set to 1 to indicate the last sector. When firmware commands DF to write 7 sectors starting with Sector number 3, DF fills the sector requested queue with sector number 3, 4, 7, 8, 9, B, and D. The LBA offset starts from 0000 and increments to 0006 for each subsequent sector, since there is no skipping.

As the valid bit entry for entry 0 is set to 1, CH0 byte FIFO starts reading data for sector number 0003 from the buffer memory. This may be preceded by and/or followed by a CRC. The data is stored in the CH0 byte FIFO. When the byte FIFO finishes processing sector 0003, the CH0 byte FIFO sets the CH0 done bit for sector 0003 to 1. This process is repeated until a last sector bit of 1, a reassign bit of 1 or a CRC error is detected. For example, when the CH0 byte FIFO detects a CRC error in the data for Sector number 000B, the CH0 byte FIFO sets the CH0 byte error bit to 1 and informing other modules not to process entry number 5, Sector number 000B. A CRC error bit for entry row number 5 is shown. Thus, the CH0 byte FIFO stops reading data after Sector number 000B.

Figure 7:
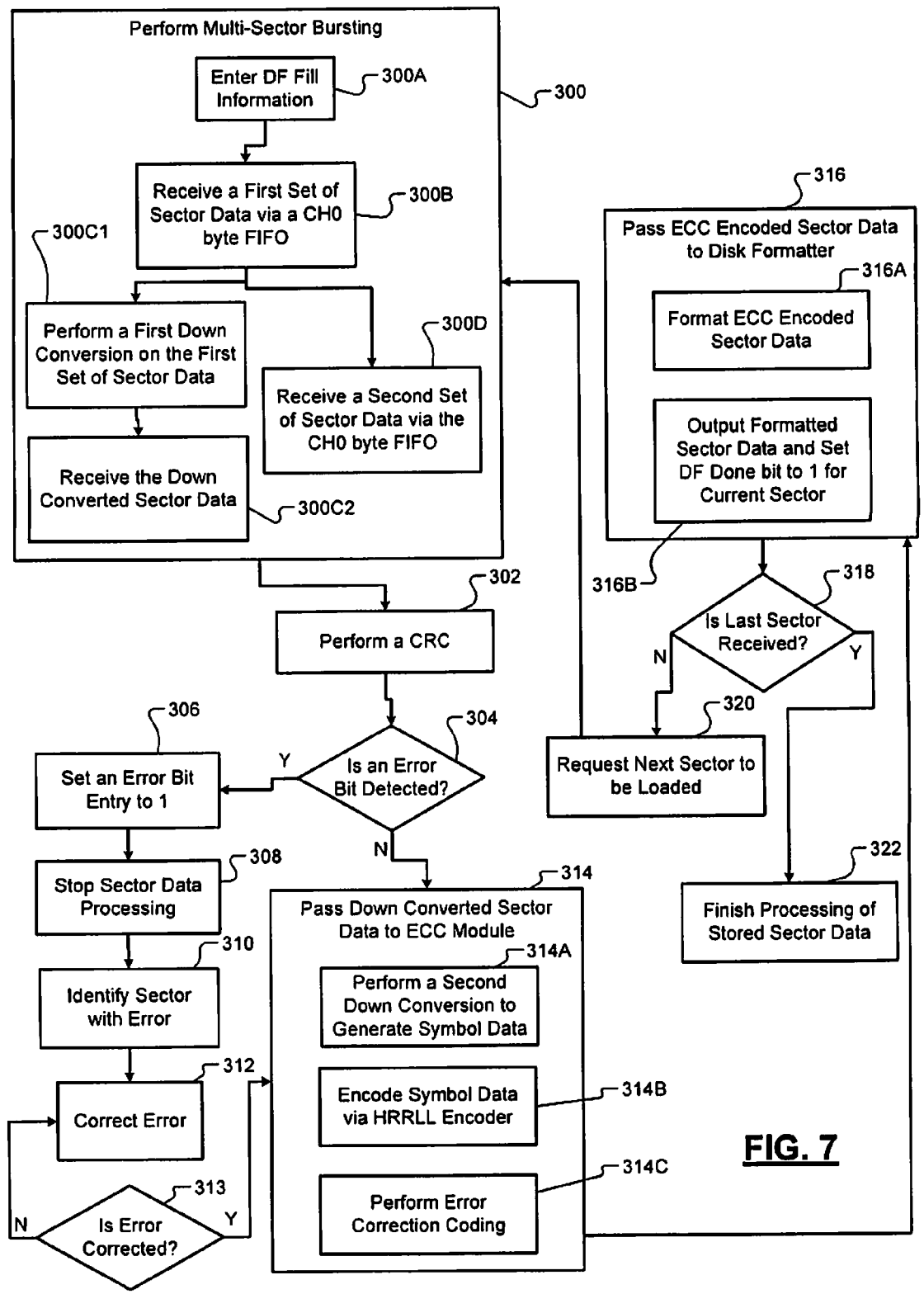
FIG. 7 is a logic flow diagram illustrating a method of managing sector data transfer over a disk channel in accordance with an embodiment of the present disclosure.

Referring to FIG. 7, a logic flow diagram illustrating a method of managing sector data transfer over a disk channel is shown. Although the following steps are described primarily with respect to the embodiments of FIGS. 4 and 6 and with respect to a write operation, they may be easily modified for other embodiments of the present invention and reversed for a read operation. Also, the below steps describe a "handshaking" process in which sectors are handed off between disk channel modules as they are passed from one module to next module along a pipeline. The present method includes indications when data is ready to be moved to or processed by the next disk channel module in line. Furthermore, the following steps describe a write operation, the steps may be easily modified and performed in a reverse order for a read operation. Moreover, the steps are described with respect to pipeline stages. The steps may be performed simultaneously by multiple disk channel modules with respect to different sector data or sets of sector data.

In step 300, a DF module, such as the DF module 60", loads sector data. When the DF module is initialized it performs multi-sector bursting. Multi-sector bursting refers to receiving and processing multiple sectors simultaneously. Any number of sectors worth of data may be processed, depending upon the memory sizes available in the disk channel modules. Multi-sector bursting from a buffer memory frees up that memory for other channels, interfaces or purposes. For the embodiment below described, four sectors are received at a time.

In step 300A, the DF module enters DF fill information, such as sector requested information, LBA offset information, reassign sector information and last sector information based on a received command signal into a sector request queue. The sector request information, as shown has LBA numbers that are used to identify the target sectors of interest. In step 300B, a byte FIFO module, such as the byte FIFO module 111, receives one or more sectors of data. For a first reception, the byte FIFO module may receive a first set of four sectors. Error bits and status flag bits are cleared or set to 0 and entry valid bits for the associated entries of the first set of four sectors are set to 1.

In step 300C1, the received sector data is down converted via a byte down converter. The CH0 byte done bits, such as for the first four entries, are set to 1 via the CH0 byte read pointer, indicating that the byte FIFO module has completed processing of or is done with the first set of four sectors. In step 300C2, the down converted data is received by a symbol FIFO module, such as the symbol FIFO module 114. In step 300D, the next sector or sectors of data, such as a second set of four sectors, are received by the byte FIFO module when available. The entry valid bits for the associated entries of the second set of four sectors are set to 1. The CH0 byte done bits for the entries associated with the sector or sectors received in step 300D are set to 0 indicating that they are loaded and that the CH0 byte FIFO is not done processing the sector data.

A CRC or other bit error check may be performed on the received sectors at any point prior to the byte FIFO module, between the byte FIFO module and the symbol FIFO module, and after the symbol FIFO module. When a bit error or other error condition is detected, an associated error bit, such as the CH0 byte error bit or the CH0 symbol error bit, is set to 1. An example of a CRC and error bit setting are provided by steps 302-308.

In step 302, the first set of four sectors are transferred through the CRC module or some other bit error checking module, one sector at a time. As the CRC module is done with a sector, the CRC module indicates the done status thereof to the DF via the CRC read pointer, which sets the appropriate CRC module done bit. In step 304, when a bit error or other error condition is detected the CRC module proceeds to step 306, otherwise to step 314. In step 306, an associated error bit, such as the CRC error bit, is set to 1. In step 308, the DF stops sector data processing.

In step 310, when an error occurs, the DF module correlates registers and counters to identify the sector or sectors where the error occurred. In step 312, the DF module may access bit correction or other correction software to correct the identified error. In step 313, when the error is corrected the DF module may proceed to step 314 or other step subsequent to that last completed when the error was detected. Upon correction of the identified error, the DF module clears the error bits involved and may activate the disk channel and allow additional data to move through the pipeline. The state correlation provides accurate error recovery and status information for detected errors. When the error is not corrected the DF module returns to step 312.

In step 314, each sector is passed from the CRC module to the ECC module. This occurs one sector at a time. In step 314A, a current sector is down-converted via a symbol down converter and provided to a sector FIFO and a HRRLL encoder, such as the ECC sector FIFO module 140 and the HRRLL encoder 132. In step 314B, the current sector is encoded via the HRRLL encoder. In step 314C, the current sector is error correction coded via an AECC module, such as the AECC module 134. As the AECC module is done with a sector, the AECC module indicates such status to the DF via the ECC buffer read pointer, which sets the appropriate AECC module done bit. A CRC or other bit error check may be performed on the current sector at any point prior to the symbol down converter, between the symbol down converter and the AECC module, and after the AECC module. When a bit error or other error condition is detected an associated error bit, such as the ECC error bit, is set to 1.

In step 316, the current sector or sector of interest is transferred to and formatted by the DF module. In step 316A, the sector is formatted. In step 316B, outputs the formatted sector and sets the DF done bit to 1 and the entry valid bit to 0. The DF done bit is set via the DF read pointer. A CRC may be performed on the current sector before, within, or after the DF module. When a bit error or other error condition is detected an associated error bit, such as the DF error bit, is set to 1. An example of a CRC and error bit setting are provided by steps 302-308.

In step 318, when the last sector to be written has been received by the byte FIFO module, the DF module proceeds to step 322, otherwise to step 320.

In step 320, the DF module requests reception of the next sector to be loaded into the byte FIFO module. Once loaded, the error bits and status flag bits are cleared and the entry valid bit for that sector entry is set to 1. Note that the above-stated pointers are not fixed and are adjusted as sectors are passed between disk channel modules and as new sectors are received by the byte FIFO module. For example, when the CH0 byte read pointer is done with the eighth sector requested, the CH0 byte read pointer is used to point to a ninth sector that is received and indicated via entry 0. This may be referred to as pointer "wrapping around". In step 322, the DF module in effect returns to step 300 and loads data for the next sector.

The above-described steps are meant to be illustrative examples; the steps may be performed sequentially, synchronously, simultaneously, or in a different order depending upon the application.

Figure 8:
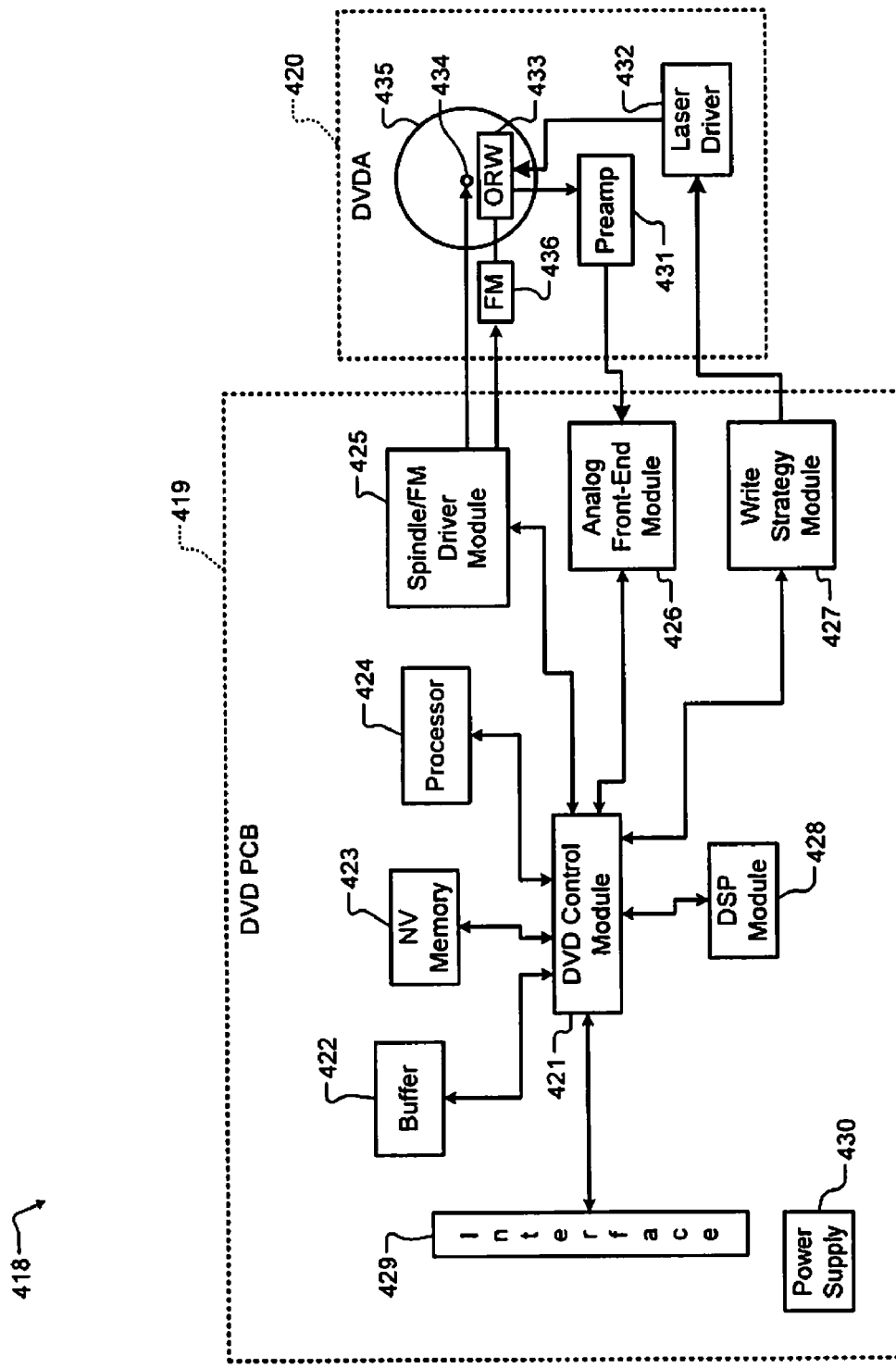
FIG. 8 is a functional block diagram of a DVD drive.

Referring now to FIG. 8, a functional block diagram of a DVD drive is shown. The teachings of the disclosure can be implemented in a DVD control module 421 of a DVD drive 418 or of a CD drive (not shown). The DVD control module 421 may have a sector request queue and perform disc channel management as above described. The DVD drive 418 includes a DVD PCB 419 and a DVD assembly (DVDA) 420. The DVD PCB 419 includes a DVD control module 421, a buffer 422, nonvolatile memory 423, a processor 424, a spindle/FM (feed motor) driver module 425, an analog front-end module 426, a write strategy module 427, and a DSP module 428.

The DVD control module 421 controls components of the DVDA 420 and communicates with an external device (not shown) via an I/O interface 429. The external device may include a computer, a multimedia device, a mobile computing device, etc. The I/O interface 429 may include wireline and/or wireless communication links.

The DVD control module 421 may receive data from the buffer 422, nonvolatile memory 423, the processor 424, the spindle/FM driver module 425, the analog front-end module 426, the write strategy module 427, the DSP module 428, and/or the I/O interface 429. The processor 424 may process the data, including encoding, decoding, filtering, and/or formatting. The DSP module 428 performs signal processing, such as video and/or audio coding/decoding. The processed data may be output to the buffer 422, nonvolatile memory 423, the processor 424, the spindle/FM driver module 425, the analog front-end module 426, the write strategy module 427, the DSP module 428, and/or the I/O interface 429.

The DVD control module 421 may use the buffer 422 and/or nonvolatile memory 423 to store data related to the control and operation of the DVD drive 418. The buffer 422 may include DRAM, SDRAM, etc. The nonvolatile memory 423 may include flash memory (including NAND and NOR flash memory), phase change memory, magnetic RAM, or multi-state memory, in which each memory cell has more than two states. The DVD PCB 419 includes a power supply 430 that provides power to the components of the DVD drive 418.

The DVDA 420 may include a preamplifier device 431, a laser driver 432, and an optical device 433, which may be an optical read/write (ORW) device or an optical read-only (OR) device. A spindle motor 434 rotates an optical storage medium 435, and a feed motor 436 actuates the optical device 433 relative to the optical storage medium 435.

When reading data from the optical storage medium 435, the laser driver provides a read power to the optical device 433. The optical device 433 detects data from the optical storage medium 435, and transmits the data to the preamplifier device 431. The analog front-end module 426 receives data from the preamplifier device 431 and performs such functions as filtering and A/D conversion. To write to the optical storage medium 435, the write strategy module 427 transmits power level and timing data to the laser driver 432. The laser driver 432 controls the optical device 433 to write data to the optical storage medium 435.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. A disk channel comprising:
    a first control module that (i) comprises a plurality of disk channel modules and (ii) is configured to process data for a read/write operation on a rotating medium, wherein each of the disk channel modules are configured to process the data for the read/write operation on the rotating medium;
    a first memory that comprises a sector request queue, wherein the sector request queue has status information of each of the plurality of disk channel modules; and
    a second control module configured to manage transfers of the data based on the status information, wherein the transfers of the data are on the disk channel and between the plurality of disk channel modules.

2. The disk channel of claim 1, wherein the second control module is configured to manage (i) reception of sector data to the disk channel, (ii) transfer of the sector data between the plurality of disk channel modules, and (iii) transmission of the sector data from the disk channel based on the sector request queue.

3. The disk channel of claim 1, wherein the second control module is configured to burst data for a plurality of sectors into the disk channel.

4. The disk channel of claim 1, wherein the plurality of disk channel modules is configured to process data for a plurality of sectors during a same time period.

5. The disk channel of claim 1, wherein one of the plurality of disk channel modules includes the second control module.

6. The disk channel of claim 1, wherein:
    the first memory is configured to store, associated with the sector request queue, at least one pointer indicating sector status of at least one of the disk channel modules; and
    the second control module is configured to manage the transfers of the data based on the sector status.

7. The disk channel of claim 6, wherein the at least one pointer comprises at least one of a disk formatter pointer, an error correction code pointer, a cyclical redundancy check pointer, and a channel pointer.

8. The disk channel of claim 6, wherein the at least one pointer comprises:
    a disk formatter pointer to indicate a first sector status of a disk formatter module;
    an error correction code pointer to indicate a second sector status of an error correction code module;
    a cyclical redundancy check pointer to indicate a third sector status of a cyclical redundancy check module; and
    a channel pointer to indicate a fourth sector status of a channel module,
    wherein the second control module is configured to manage the transfers of the data based on the first sector status, the second sector status, the third sector status and the fourth sector status.

9. The disk channel of claim 1, wherein:
    the sector request queue comprises sector request information including an address identifying a sector of the data; and
    the second control module is configured to manage the transfers of the data based on the sector request information.

10. The disk channel of claim 1, wherein:
    the sector request queue comprises logical block address information including (i) a logical block address offset and (ii) a logical block address value of a sector of the data; and
    the second control module is configured to manage the transfers of the data based on the logical block address information.

11. The disk channel of claim 1, wherein:
    the sector request queue comprises reassign sector information indicating a sector of the data has been moved based on (i) a defective sector or (ii) a masked sector; and
    the second control module is configured to manage the transfers of the data based on the reassign sector information.

12. The disk channel of claim 1, wherein:
    the sector request queue comprises entry valid information; and
    the second control module is configured to manage the transfers of the data based on the entry valid information.

13. The disk channel of claim 12, wherein the entry valid information comprises at least one of a channel byte first-in-first-out error indication, a channel symbol error indication, a error correction code channel error indication, a error correction code buffer error indication, or a disk formatter error indication.

14. The disk channel of claim 12, wherein the entry valid information comprises a channel byte first-in-first-out error indication, a channel symbol error indication, a error correction code channel error indication, a error correction code buffer error indication, and a disk formatter error indication.

15. The disk channel of claim 1, wherein:
    the sector request queue comprises sector complete information associated with each of the plurality of disk channel modules, wherein the sector complete information indicates when each of the plurality of disk channel modules has completed processing of the data for a sector; and
    the second control module is configured to manage the transfers of the data based on the sector complete information.

16. The disk channel of claim 1, wherein:
    the sector request queue comprises bit error information; and the second control module is configured to stop transfer of the data through the plurality of disk channel modules based on the bit error information.

17. The disk channel of claim 1, wherein the sector request queue comprises bit error information associated with a disk channel module.

18. A hard disk drive comprising the disk channel of claim 1.

19. The hard disk drive of claim 18, further comprising a read/write head that transfers the data between the rotating medium and the second control module.

20. The disk channel of claim 1, wherein:
the plurality of disk channel modules are connected between (i) the rotating medium and (ii) at least one of a second memory or a host interface; and
the data transfers are between the rotating medium and the at least one of the second memory or the host interface.

21. The disk channel of claim 20, wherein the disk channel modules comprise a channel module, a cyclical redundancy check module, an error correction coding module and a disk formatter module, wherein:
the channel module is configured to transfer the data between the second memory and the cyclical redundancy check module;
the cyclical redundancy check module is configured to transfer data between the channel module and the error correction coding module;
the error correction coding module is configured to transfer data between the cyclical redundancy check module and the disk formatter module; and
the disk formatter module is configured to transfer data between the error correction coding module and the rotating medium.

22. The disk channel of claim 21, wherein the second control module is configured to request bursting of data for a first set of sectors into a byte first-in-first-out module of the channel module.

23. The disk channel of claim 22, wherein the second control module is configured to request bursting of data for a second set of sectors into the byte first-in-first-out module prior to the first set of sectors being transferred from the channel module to one of the cyclical redundancy check module and the error correction coding module.

24. The disk channel of claim 21, wherein the channel module comprises:
a byte first-in-first-out module configured to receive a first set of sector data; and
a byte downconverter configured to downconvert a second set of sector data while the byte first-in-first-out module processes the first set of sector data.

25. The disk channel of claim 21, wherein the channel module is configured to process a second set of sectors while at least one of the cyclical redundancy check module or the error correction coding module processes a first set of sectors.

26. The disk channel of claim 21, wherein:
the disk formatter module comprises the second control module; and
the second control module is configured to (i) control bursting of data into the channel module and (ii) request bursting of data into the channel module based on whether a last sector to be written has been received by the channel module.

* * * * *